United States Patent
Imanishi et al.

(10) Patent No.: US 8,361,667 B2
(45) Date of Patent: Jan. 29, 2013

(54) FUEL CELL SYSTEM AND ITS CONTROL METHOD

(75) Inventors: Hiroyuki Imanishi, Toyota (JP); Kota Manabe, Toyota (JP); Tomoya Ogawa, Toyota (JP); Yoshiaki Naganuma, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 574 days.

(21) Appl. No.: 12/600,953

(22) PCT Filed: Jul. 3, 2008

(86) PCT No.: PCT/JP2008/062430
§ 371 (c)(1),
(2), (4) Date: Nov. 19, 2009

(87) PCT Pub. No.: WO2009/005169
PCT Pub. Date: Aug. 1, 2009

(65) Prior Publication Data
US 2010/0159342 A1 Jun. 24, 2010

(30) Foreign Application Priority Data
Jul. 3, 2007 (JP) ................................. 2007-175150

(51) Int. Cl.
*H01M 8/04* (2006.01)
(52) U.S. Cl. ........................................ 429/432; 429/444
(58) Field of Classification Search .................. 429/432, 429/444, 446
See application file for complete search history.

(56) References Cited

U.S. PATENT DOCUMENTS

| 5,366,821 A | * | 11/1994 | Merritt et al. ................ 429/422 |
| 2003/0077488 A1 | * | 4/2003 | Yamamoto et al. ............ 429/17 |
| 2004/0101724 A1 | | 5/2004 | Imamura et al. |

FOREIGN PATENT DOCUMENTS

| DE | 600 30 000 T2 | 9/2007 |
| EP | 1 361 621 A2 | 11/2003 |
| JP | 2000-331693 A | 11/2000 |
| JP | 2002-313388 A | 10/2002 |
| JP | 2003-288926 A | 10/2003 |
| JP | 2003-317765 A | 11/2003 |
| JP | 2004-030979 A | 1/2004 |
| JP | 2004-172027 A | 6/2004 |
| JP | 2005-174645 A | 6/2005 |
| JP | 2006-073501 A | 3/2006 |
| JP | 2006-286513 A | 10/2006 |
| JP | 2007-66844 A | 3/2007 |

(Continued)

OTHER PUBLICATIONS

Office Action mailed Apr. 20, 2012 in German Patent Application No. 112008001674.7 and English translation thereof.

(Continued)

*Primary Examiner* — Stephen J. Kalafut
(74) *Attorney, Agent, or Firm* — Kenyon & Kenyon LLP

(57) ABSTRACT

Disclosed is a fuel cell system including a fuel cell which generates a power, and control means for decreasing the amount of a reactant gas to be supplied to the fuel cell to an amount smaller than that during normal power generation to realize low-efficiency power generation of the fuel cell. The control means sets the voltage lower limit value of the fuel cell so that the amount of an anode gas (pumping hydrogen) to be formed in a cathode of the fuel cell during the low-efficiency power generation is a predetermined amount or less.

5 Claims, 7 Drawing Sheets

FOREIGN PATENT DOCUMENTS

| | | |
|---|---|---|
| WO | WO 01/03215 A1 | 1/2001 |
| WO | 01/43216 A2 | 6/2001 |

OTHER PUBLICATIONS

"Personenwagen mit Brennstoffzellen- und Supercap-Antrieb", Paul Scherrer Institut, Villigen, Switzerland, Jul. 28, 2006, pp. 1-55.

"Systemanalyse und Betriebsfuehrung eines Brennstoffzellen-BHKW", Hans-Juergen JAHN, Jan. 19, 2006, Index & pp. 1-170 (related to WO/0143216).

Letter from Kuhnen & Wacker dated Jun. 6, 2012 re relevancy of references cited in DE Office Action.

* cited by examiner

Fig. 5

| FUEL CELL TEMPERATURE(°C) | OUTPUT CURRENT(A) | | | | | | | | | |
|---|---|---|---|---|---|---|---|---|---|---|
| | $I_1$ | $I_2$ | $I_3$ | $I_4$ | $I_5$ | $I_6$ | $I_7$ | $I_8$ | $I_9$ | $I_{10}$ |
| $T_1$ | $V_{11}$ | $V_{12}$ | $V_{13}$ | 0 | 0 | 0 | 0 | 0 | 0 | 0 |
| $T_2$ | $V_{21}$ | $V_{22}$ | $V_{23}$ | $V_{24}$ | 0 | 0 | 0 | 0 | 0 | 0 |
| $T_3$ | $V_{31}$ | $V_{32}$ | $V_{33}$ | $V_{34}$ | $V_{35}$ | $V_{36}$ | 0 | 0 | 0 | 0 |
| $T_4$ | $V_{41}$ | $V_{42}$ | $V_{43}$ | $V_{44}$ | $V_{45}$ | $V_{46}$ | $V_{47}$ | $V_{48}$ | 0 | 0 |
| $T_5$ | $V_{51}$ | $V_{52}$ | $V_{53}$ | $V_{54}$ | $V_{55}$ | $V_{56}$ | $V_{57}$ | $V_{58}$ | $V_{59}$ | $V_{50}$ |
| $T_6$ | $V_{61}$ | $V_{62}$ | $V_{63}$ | $V_{64}$ | $V_{65}$ | $V_{66}$ | $V_{67}$ | $V_{68}$ | $V_{69}$ | $V_{60}$ |

$I_1 < I_2 < \cdots < I_{10}$ $T_1 < T_2 < \cdots < T_6$

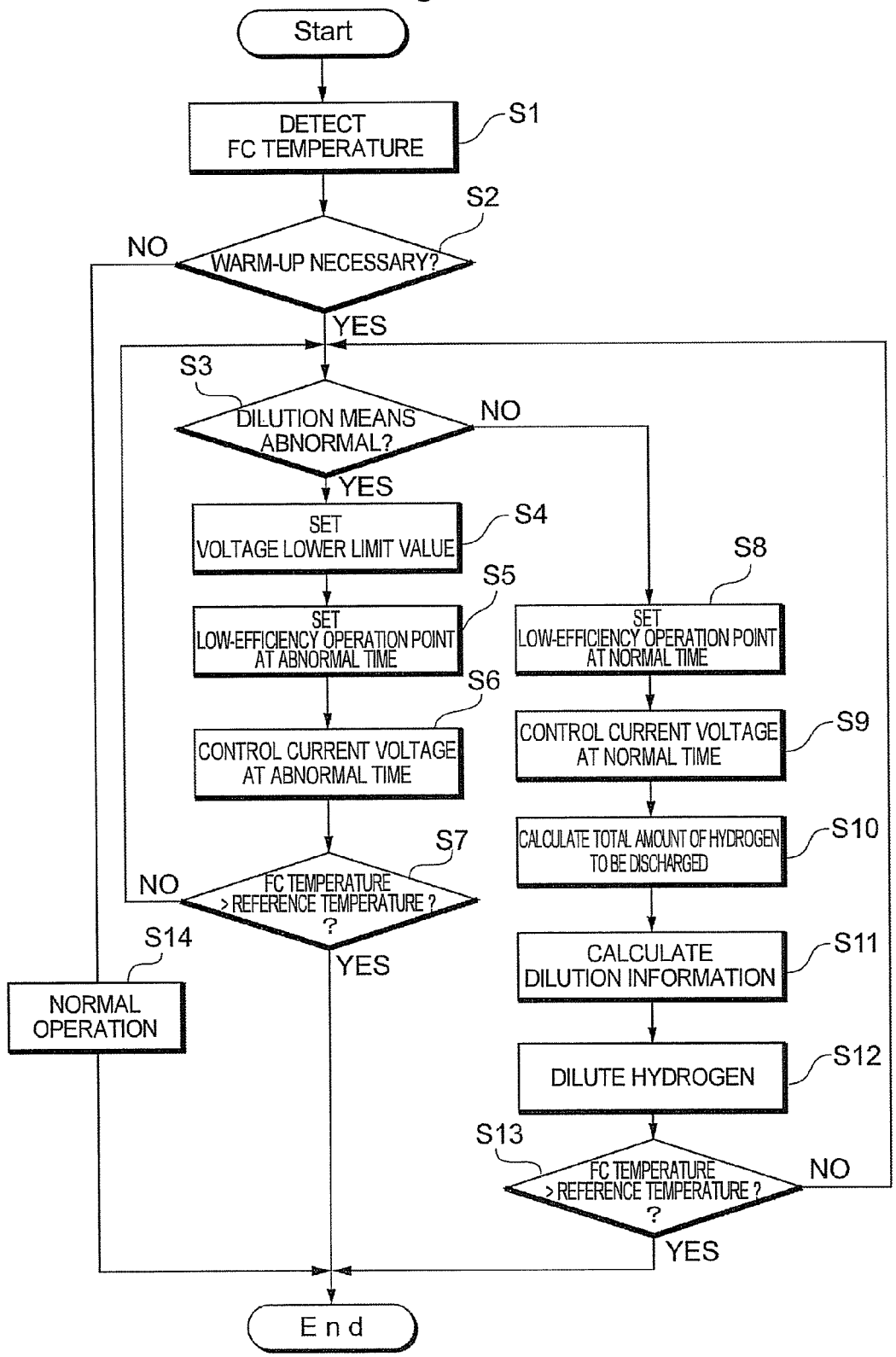

FUEL CELL SYSTEM AND ITS CONTROL METHOD

This is a 371 national phase application of PCT/JP2008/062430 filed 3 Jul. 2008, which claims priority to Japanese Patent Application No. 2007-175150 filed 3 Jul. 2007, the contents of which are incorporated herein by reference.

TECHNICAL FIELD

The present invention relates to a fuel cell system and a control method of the system.

BACKGROUND ART

Heretofore, a fuel cell system including a fuel cell for receiving a supplied reactant gas (a fuel gas and an oxidizing gas) to generate a power has been suggested and put to practical use. From an anode of the fuel cell of this fuel cell system, a fuel off gas is discharged, the gas containing a fuel (hydrogen) which is not consumed during the power generation but is left over. When such a fuel off gas is discharged as it is from the system, the discharged amount of hydrogen contained in the fuel off gas exceeds a predetermined environmental reference value on occasion. Therefore, a technology has been suggested in which the fuel off gas discharged from the anode of the fuel cell is mixed with a diluent gas such as air, and diluted, thereby decreasing a hydrogen concentration.

Meanwhile, at present, there has been suggested a technology of performing the low-efficiency operation (the operation with a power generation efficiency lower than that during a normal operation) of the fuel cell to convert the energy of the supplied reactant gas into more thermal energy, thereby raising the temperature of the fuel cell. It is known that in such a low-efficiency operation, not only the fuel off gas containing hydrogen is discharged from the anode of the fuel cell but also an anode gas (so-called pumping hydrogen) is formed in a cathode of the fuel cell. Therefore, in recent years, a technology has been suggested in which dilution means is provided on the cathode side of the fuel cell to decrease the concentration of the pumping hydrogen to be discharged (e.g., see Japanese Patent Application Laid-Open No. 2005-174645).

DISCLOSURE OF THE INVENTION

However, even in a case where a technology disclosed in Japanese Patent Application Laid-Open No. 2005-174645 is employed, when cathode-side dilution means breaks down, the concentration of pumping hydrogen cannot be decreased, and hence the concentration of hydrogen to be discharged might not be suppressed to a predetermined environmental reference value or less.

The present invention has been developed in view of such a situation, and an object thereof is to provide a fuel cell system capable of suppressing the discharge of the pumping hydrogen during low-efficiency power generation without resorting to the dilution means.

To achieve the above object, according to the present invention, there is provided a fuel cell system comprising: a fuel cell which generates a power; and control means for decreasing the amount of a reactant gas to be supplied to the fuel cell to an amount smaller than that during normal power generation to realize low-efficiency power generation of the fuel cell, wherein the control means sets the voltage lower limit value of the fuel cell so that the amount of an anode gas (pumping hydrogen) to be formed in a cathode of the fuel cell during the low-efficiency power generation is the predetermined amount or less.

Moreover, a control method according to the present invention is a control method of a fuel cell system which includes a fuel cell to generate a power and in which the amount of a reactant gas to be supplied to this fuel cell is decreased to an amount smaller than that during normal power generation to realize low-efficiency power generation of the fuel cell, the method comprising a step of setting the voltage lower limit value of the fuel cell so that the amount of an anode gas (pumping hydrogen) to be formed in a cathode of the fuel cell during the low-efficiency power generation is a predetermined amount or less.

When such constitution and method are employed, the voltage lower limit value of the fuel cell is set to a specific value during the low-efficiency power generation, whereby the amount of the pumping hydrogen to be formed can be suppressed to a predetermined amount or less. Therefore, the amount of the pumping hydrogen to be discharged during the low-efficiency power generation can be decreased, and hence a device for diluting the pumping hydrogen can be omitted.

The fuel cell system may include dilution means for diluting the pumping hydrogen. Moreover, only when this dilution means is abnormal, it is possible to employ the control device which sets the voltage lower limit value of the fuel cell so that the amount of the pumping hydrogen to be formed during the low-efficiency power generation is a predetermined amount or less.

When such a constitution is employed and the dilution means is normal, the concentration of the pumping hydrogen can be decreased by the dilution means, and the low-efficiency power generation can be performed especially without setting the lower limit value of the voltage, whereby warm-up (self heat generation) can effectively be performed. On the other hand, when the dilution means is abnormal, the low-efficiency power generation is performed while setting the voltage lower limit value of the fuel cell to a specific value, whereby the amount of the pumping hydrogen to be formed can be suppressed to a predetermined amount or less.

Moreover, the fuel cell system may be provided with a gas supply passage which supplies an oxidizing gas supplied from an oxidizing gas supply source to the cathode of the fuel cell; and a gas discharge passage through which the gas, discharged from the cathode of the fuel cell is circulated. Furthermore, it is possible to employ the dilution means having a bypass passage which allows a part of the oxidizing gas flowing through the gas supply passage to bypass the fuel cell and which guides the gas to the gas discharge passage, and a bypass valve which regulates the flow rate of the oxidizing gas circulating through this bypass passage, and the dilution means dilutes the pumping hydrogen with the oxidizing gas flowing from the gas supply passage to the gas discharge passage through the bypass passage.

In addition, the fuel cell system may be provided with a pressure sensor which detects the pressure of the oxidizing gas supplied from the oxidizing gas supply source. In such a case, it is possible to employ abnormality judgment means for estimating the pressure of the oxidizing gas to be supplied from the oxidizing gas supply source based on the command value of the flow rate of the oxidizing gas circulating through the bypass passage and the open degree of the bypass valve and for judging the abnormality of the dilution means based on a deviation between this estimated pressure and the detected pressure detected by the pressure sensor.

Moreover, in the fuel cell system, it is possible to employ the abnormality judgment means for judging that closing breakdown occurs in the bypass valve, when the estimated pressure is smaller than the detected pressure and the absolute value of the deviation between the estimated pressure and the detected pressure exceeds a predetermined threshold value.

Furthermore, in the fuel cell system, it is possible to employ the dilution means having a back pressure valve which regulates the pressure of the gas circulating through the gas discharge passage. In such a case, it is possible to employ the abnormality judgment means for judging that opening breakdown occurs in the back pressure valve, when the estimated pressure is larger than the detected pressure and the absolute value of the deviation between the estimated pressure and the detected pressure exceeds the predetermined threshold value.

According to the present invention, it is possible to provide the fuel cell system capable of suppressing the discharge of the pumping hydrogen during the low-efficiency power generation without resorting to the dilution means.

BRIEF DESCRIPTION OF THE DRAWINGS

FIG. 5 is a table for use in setting a voltage lower limit value during the low-efficiency operation (when dilution means is abnormal) of the fuel cell system shown in FIG. 1;

FIG. 7 is a flow chart for explaining the operation method of the fuel cell system shown in FIG. 1.

BEST MODE FOR CARRYING OUT THE INVENTION

Hereinafter, a fuel cell system according to an embodiment of the present invention will be described with reference to the drawings. In the present embodiment, there will be described an example in which the present invention is applied to a car-mounted power generation system of a fuel cell vehicle.

First, the constitution of a fuel cell system 1 according to the embodiment of the present invention will be described with reference to FIGS. 1 to 6.

Figure 1:
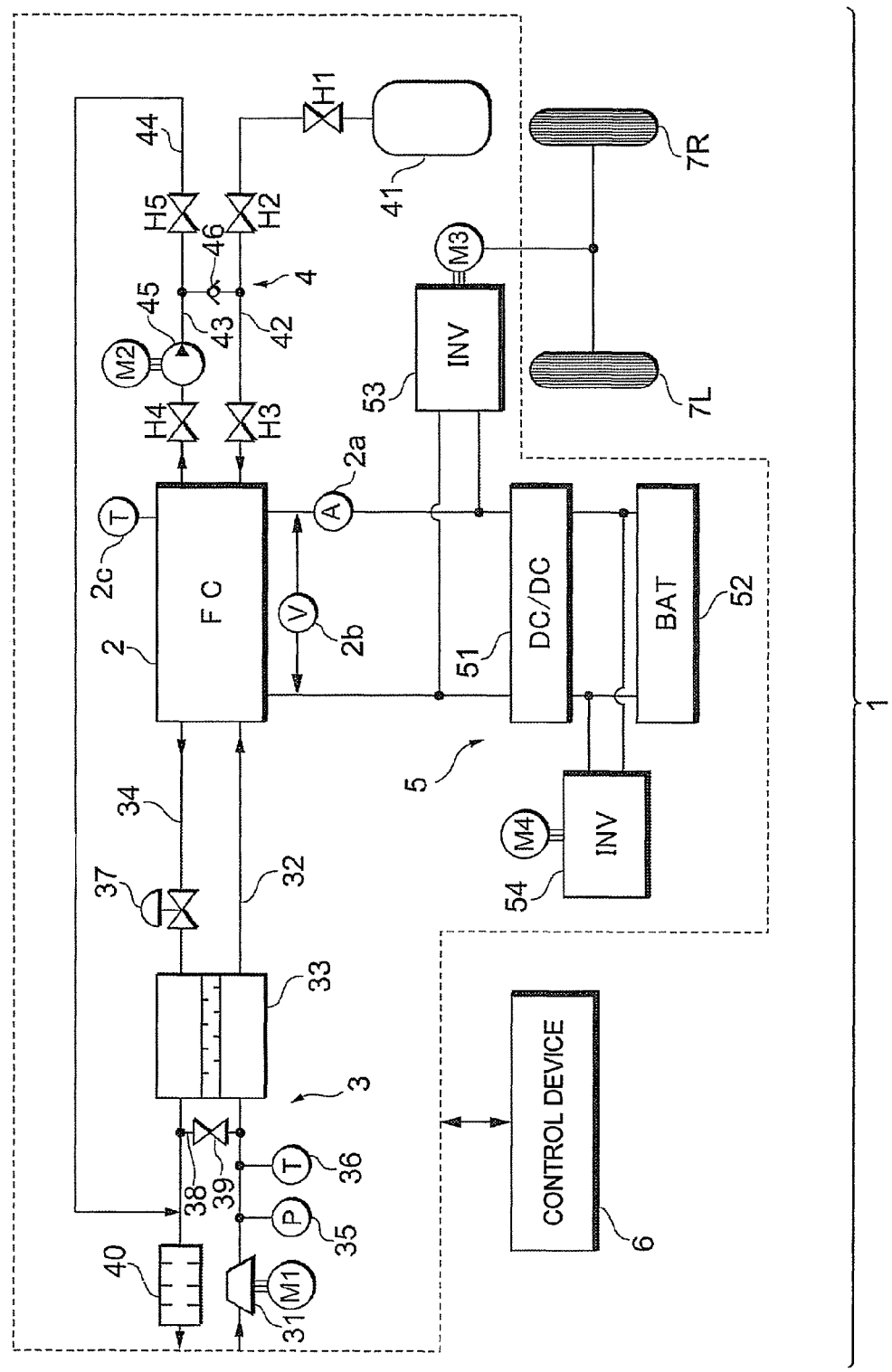
FIG. 1 is a constitution diagram of a fuel cell system according to an embodiment of the present invention.

As shown in FIG. 1, the fuel cell system 1 according to the present embodiment includes a fuel cell 2 which receives a supplied reactant gas (an oxidizing gas and a fuel gas) to generate a power, an oxidizing gas piping system 3 which supplies air as the oxidizing gas to the fuel cell 2, a fuel gas piping system 4 which supplies a hydrogen gas as the fuel gas to the fuel cell 2, a power system 5 which charges or discharges the system power, a control device 6 which integrally controls the whole system and the like.

The fuel cell 2 is constituted of, for example, a solid polymer electrolyte type, and has a stack structure in which a large number of unitary cells 20 (FIG. 4A) are stacked. Each of the unitary cells 20 of the fuel cell 2 has a cathode (an air pole) on one face of an electrolytic film 21 (FIG. 4A), and an anode (a fuel pole) on the other face of the film, and further has a pair of separators which sandwich the cathode and anode between both sides. The fuel gas is supplied to a fuel gas passage of one separator, the oxidizing gas is supplied to an oxidizing gas passage of the other separator, and the fuel cell 2 generates the power from this supplied gas. Moreover, a cathode off gas is discharged from the cathode of the fuel cell 2. The cathode off gas contains pumping hydrogen (described later) formed in the cathode, in addition to an oxygen off gas used in the cell reaction of the fuel cell 2.

To the fuel cell 2, a current sensor 2a and a voltage sensor 2b for detecting a current and a voltage (an output current and an output voltage) during the power generation, and a temperature sensor 2c for detecting the temperature of the fuel cell 2 are attached. Information on the output current detected by the current sensor 2a and information on the temperature detected by the temperature sensor 2c are used in voltage control described later. It is to be noted that as the fuel cell 2, in addition to the solid polymer electrolyte type, a phosphoric acid type or a dissolving carbonate type may be employed.

The oxidizing gas piping system 3 has an air compressor 31, an oxidizing gas supply passage 32, a humidifying module 33, a cathode off gas passage 34, a bypass passage 38, a diluter 40, a motor M1 for driving the air compressor 31 and the like.

The air compressor 31 is driven by the driving force of the motor M1 which operates in accordance with the control command of the control device 6 to supply, to the cathode pole of the fuel cell 2, oxygen (the oxidizing gas) taken from outside air through an air filter (not shown), and the air compressor is one embodiment of an oxidizing gas supply source in the present invention. The oxidizing gas supply passage 32 is a gas passage for guiding oxygen supplied from the air compressor 31 to the cathode of the fuel cell 2. The oxidizing gas supply passage 32 is provided with a pressure sensor 35 and a temperature sensor 36 for detecting the pressure and temperature of the oxidizing gas supplied from the air compressor 31. Information on the pressure and temperature detected by the pressure sensor 35 and the temperature sensor 36 is used in the judgment of the abnormality of dilution means described later.

The humidifying module 33 performs water content exchange between the oxidizing gas flowing through the oxidizing gas supply passage 32 and having a low wet state and the cathode off gas flowing through the cathode off gas passage 34 and having a high wet state, and the module appropriately humidifies the oxidizing gas to be supplied to the fuel cell 2. The cathode off gas passage 34 is a gas passage for discharging the cathode off gas from the system, and is one embodiment of a gas discharge passage in the present invention. A back pressure valve 37 is disposed near a cathode pole outlet of the cathode off gas passage 34. The control device 6 controls the opening/closing operation of the back pressure valve 37 to regulate the pressure of the cathode off gas circulating through the cathode off gas passage 34, so that the amount of the pumping hydrogen to be discharged is regulated.

The bypass passage 38 allows a part of the oxidizing gas flowing through the oxidizing gas supply passage 32 to bypass the fuel cell 2, and guides the gas to the cathode off gas passage 34. The bypass passage 38 is provided with a bypass valve 39. The flow rate of the oxidizing gas circulating through the bypass passage 38 is regulated by the bypass valve 39. The control device 6 controls the opening/closing operation of the bypass valve 39 to supply the oxidizing gas from the oxidizing gas supply passage 32 to the cathode off gas passage 34 through the bypass passage 38, whereby the pumping hydrogen circulating through the cathode off gas passage 34 is diluted. That is, the bypass passage 38, the bypass valve 39 and the control device 6 constitute the dilution means of the present invention. It is to be noted that the back pressure valve 37 also regulates the amount of the pumping hydrogen to be discharged, and hence constitutes the dilution means of the present invention.

The diluter 40 dilutes the hydrogen gas so as to suppress the discharge concentration of the gas to a preset concentration (a predetermined environmental reference value) or less. The diluter 40 is connected to the downstream side of the cathode off gas passage 34 and the downstream side of an anode off gas passage 44 described later, and a hydrogen off gas and the oxygen off gas are mixed, diluted and discharged from the system.

The fuel gas piping system 4 has a fuel gas supply source 41, a fuel gas supply passage 42, a fuel gas circulation passage 43, the anode off gas passage 44, a hydrogen circulation pump 45, a check valve 46, a motor M2 for driving the hydrogen circulation pump 45 and the like.

The fuel gas supply source 41 is means for supplying a fuel gas such as the hydrogen gas to the fuel cell 2, and is constituted of, for example, a high-pressure hydrogen tank, a hydrogen storage tank or the like. The fuel gas supply passage 42 is a gas passage for guiding the fuel gas discharged from the fuel gas supply source 41 to the anode pole of the fuel cell 2, and the gas passage is provided with valves such as a tank valve H1, a hydrogen supply valve H2 and an FC inlet valve H3 from the upstream side to the downstream side. The tank valve H1, the hydrogen supply valve H2 and the FC inlet valve H3 are shut valves for supplying (or shutting) the fuel gas to the fuel cell 2, and are constituted of, for example, electromagnetic valves.

The fuel gas circulation passage 43 is a return gas passage for returning an unreacted fuel gas to the fuel cell 2, and the gas passage is provided with an FC outlet valve H4, the hydrogen circulation pump 45 and the check valve 46, respectively, from the upstream side to the downstream side. The low-pressure unreacted fuel gas discharged from the fuel cell 2 is appropriately pressurized by the hydrogen circulation pump 45 driven by the driving force of the motor M2 which operates in accordance with the control command of the control device 6, and the gas is guided to the fuel gas supply passage 42. The counter flow of the fuel gas from the fuel gas supply passage 42 to the fuel gas circulation passage 43 is suppressed by the check valve 46. The anode off gas passage 44 is a gas passage for discharging, from the system, the anode off gas discharged from the fuel cell 2 and including the hydrogen off gas, and the gas passage is provided with a purge valve H5.

The power system 5 includes a high-voltage DC/DC converter 51, a battery 52, a traction inverter 53, an auxiliary machine inverter 54, a traction motor M3, an auxiliary machine motor M4 and the like.

The high-voltage DC/DC converter 51 is a direct-current voltage converter, and has a function of regulating a direct-current voltage input from the battery 52 to output the voltage to a traction inverter 53 side, and a function of regulating a direct-current voltage input from the fuel cell 2 or the traction motor M3 to output the voltage to the battery 52. These functions of the high-voltage DC/DC converter 51 realize the charging/discharging of the battery 52. Moreover, the high-voltage DC/DC converter 51 controls the output voltage of the fuel cell 2.

The battery 52 is a chargeable/dischargeable secondary battery (e.g., a nickel hydrogen battery or the like). The battery 52 can charge a surplus power or subsidiarily supply the power by the control of a battery computer (not shown). The voltage of a part of the direct-current power generated by the fuel cell 2 is raised/lowered by the high-voltage DC/DC converter 51, thereby charging the battery 52. It is to be noted that instead of the battery 52, a chargeable/dischargeable condenser (e.g., a capacitor) other than the secondary battery may be employed.

The traction inverter 53 and the auxiliary machine inverter 54 are pulse width modulation type PWM inverters which convert the direct-current power output from the fuel cell 2 or the battery 52 in response to the given control command into a three-phase alternate-current power to supply the power to the traction motor M3 and the auxiliary machine motor M4. The traction motor M3 is a motor for driving wheels 7L, 7R. The auxiliary machine motor M4 is a motor for driving various auxiliary machines, and generically refers to the motor M1 for driving the air compressor 31, the motor M2 for driving the hydrogen circulation pump 45 and the like.

The control device 6 is constituted of a CPU, an ROM, an RAM and the like, and generally controls each unit of the system based on each input sensor signal. Specifically, the control device 6 calculates the output demand power of the fuel cell 2 based on the sensor signals sent from an accelerator pedal sensor (not shown) which detects an accelerator pedal open degree and the like. Then, the control device 6 controls the output voltage and output current of the fuel cell 2 so as to generate the output power corresponding to this output demand power. Moreover, the control device 6 controls the output pulse width and the like of the traction inverter 53 and the auxiliary machine inverter 54 to control the traction motor M3 and the auxiliary machine motor M4.

Moreover, the control device 6 detects the temperature of the fuel cell 2 based on the sensor signal output from the temperature sensor $2c$ provided in the fuel cell 2, and compares the detected temperature with a predetermined reference temperature to judge whether or not warm-up is necessary. Furthermore, the control device 6 performs normal operation processing, in a case where the device judges that the temperature of the fuel cell 2 exceeds the reference temperature and that the warm-up is not necessary. Here, the normal operation processing is the processing to perform the operation at a highly efficient operation point (i.e., the operation point having a small power loss) without performing the warm-up. On the other hand, the control device 6 performs low-efficiency operation processing (the processing to perform the operation at an operation point with a low power generation efficiency), in a case where the device judges that the temperature of the fuel cell 2 is the reference temperature or less and that the warm-up is necessary.

Here, a relation between the normal operation and the low-efficiency operation, and the generation principle of the pumping hydrogen will be described with reference to FIGS. 2A to 4B.

Figure 2A:
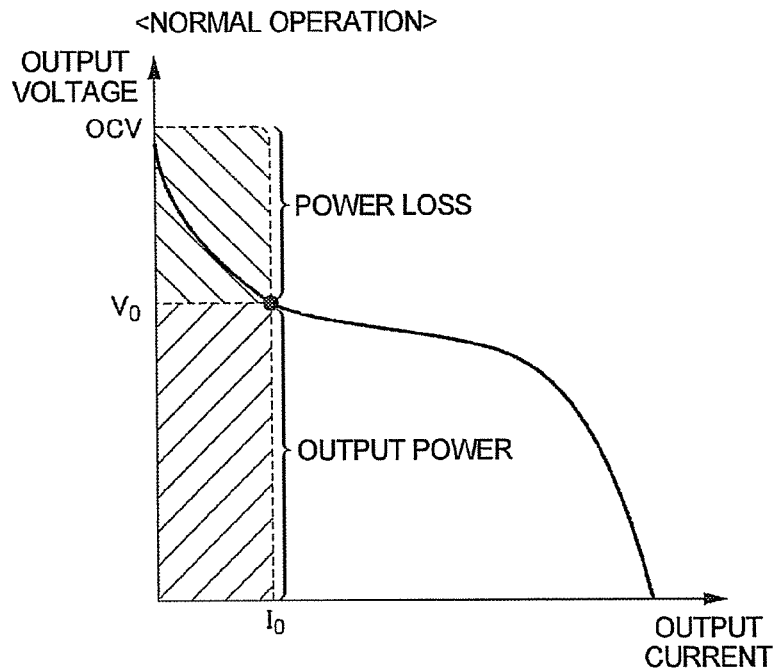
FIG. 2A is an explanatory view showing a relation between an output power and a power loss during the normal operation of the fuel cell system shown in FIG. 1.
Figure 2B:
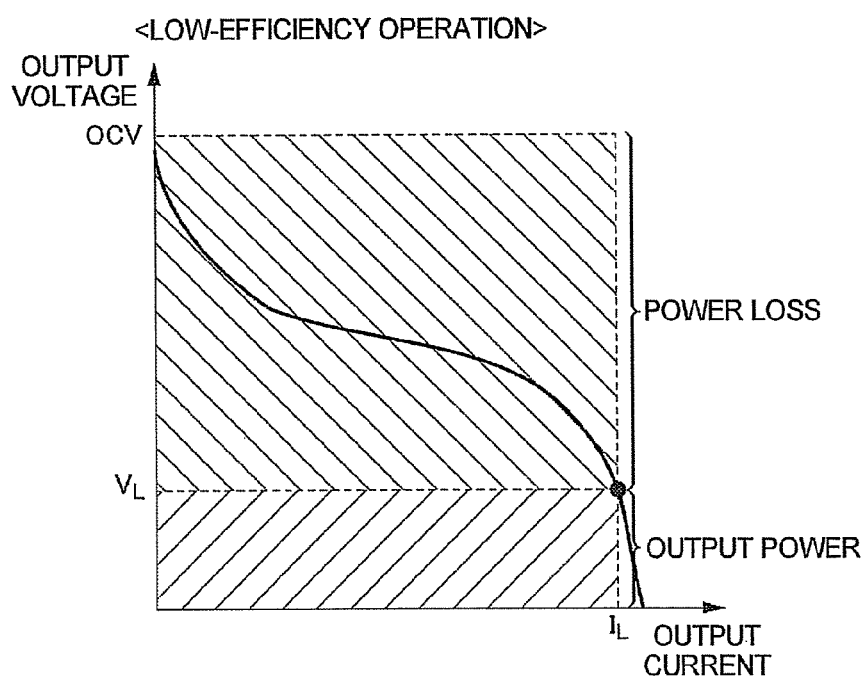
FIG. 2B is an explanatory view showing a relation between the output power and the power loss during the low-efficiency operation of the fuel cell system shown in FIG. 1.

In FIGS. 2A and 2B, the abscissa indicates the output current, and the ordinate indicates the output voltage, respectively, and an open circuit voltage (OCV) is a voltage in a state in which any current does not flow through the fuel cell 2. Generally in the fuel cell 2 capable of obtaining current/voltage characteristics (IV characteristics) shown in FIG. 2A, the control device 6 performs the operation at a normal operation point $(I_0, V_0)$ at which the power loss is small with respect to the output power. On the other hand, when a warm-up operation is performed, as shown in FIG. 2B, the control device 6 performs the operation at a low-efficiency operation point $(I_L, V_L)$ with a large power loss, to raise the internal temperature of the fuel cell 2. In a process of performing such a low-efficiency operation, as to energy which can be taken by a reaction between hydrogen and oxygen, a power loss content (thermal energy) can positively be increased, and hence immediate warm-up can be realized.

Figure 3:
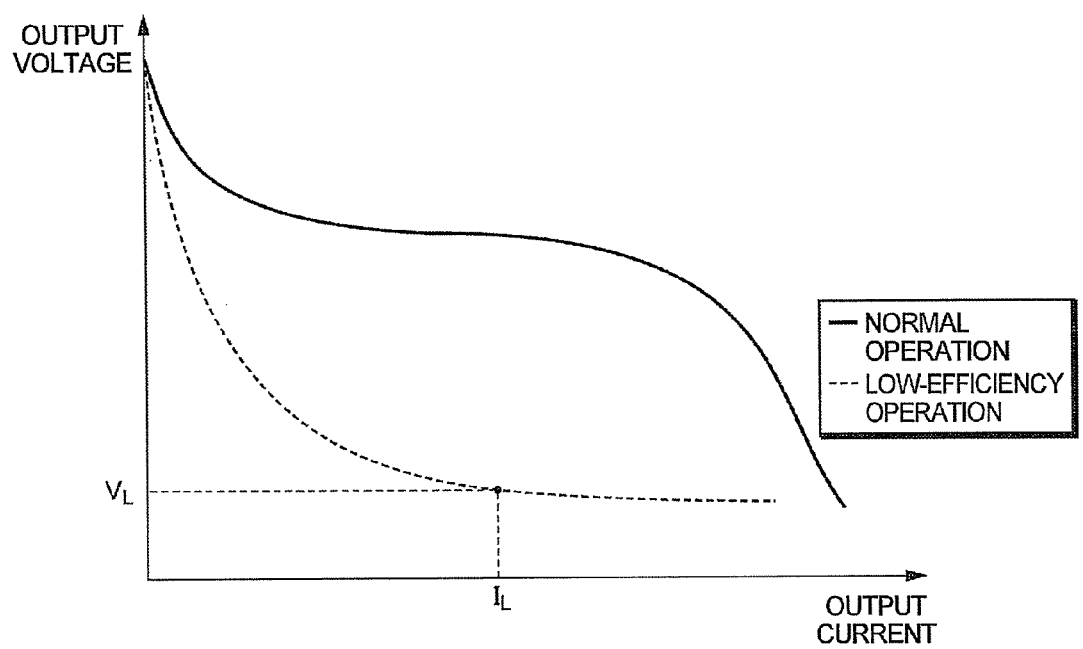
FIG. 3 is an IV characteristic map during the normal operation and low-efficiency operation of the fuel cell system shown in FIG. 1.

It is to be noted that FIG. 3 shows an IV characteristic map (a solid line) during the normal operation and an IV characteristic map (a broken line) during the low-efficiency operation, and the operation points can be determined by use of these IV characteristic maps during the normal operation and the low-efficiency operation. The IV characteristic map (the broken line) during the low-efficiency operation can appropriately be set in accordance with the output demand from the traction motor M3, and FIG. 3 shows one example of the map.

During the normal operation of the fuel cell 2, an air stoichiometric ratio is set to 1.0 or more so that the power loss is suppressed, to obtain a high power generation efficiency. Here, the air stoichiometric ratio is the ratio of the actual oxidizing gas supply amount with respect to the theoretical value of an oxidizing gas supply amount necessary for generating the power by the fuel cell 2 (a value obtained by dividing the actual oxidizing gas supply amount by the theoretical value). On the other hand, during the low-efficiency operation of the fuel cell 2, the air stoichiometric ratio is set to a ratio less than 1.0 so that the power loss is increased, to raise the temperature of the fuel cell 2. When the air stoichiometric ratio is set to a small ratio, as to the energy that can be taken by the reaction between hydrogen and oxygen, the power loss content (the thermal energy) can positively be increased, whereas the pumping hydrogen is generated in the cathode of the fuel cell 2.

Figure 4A:
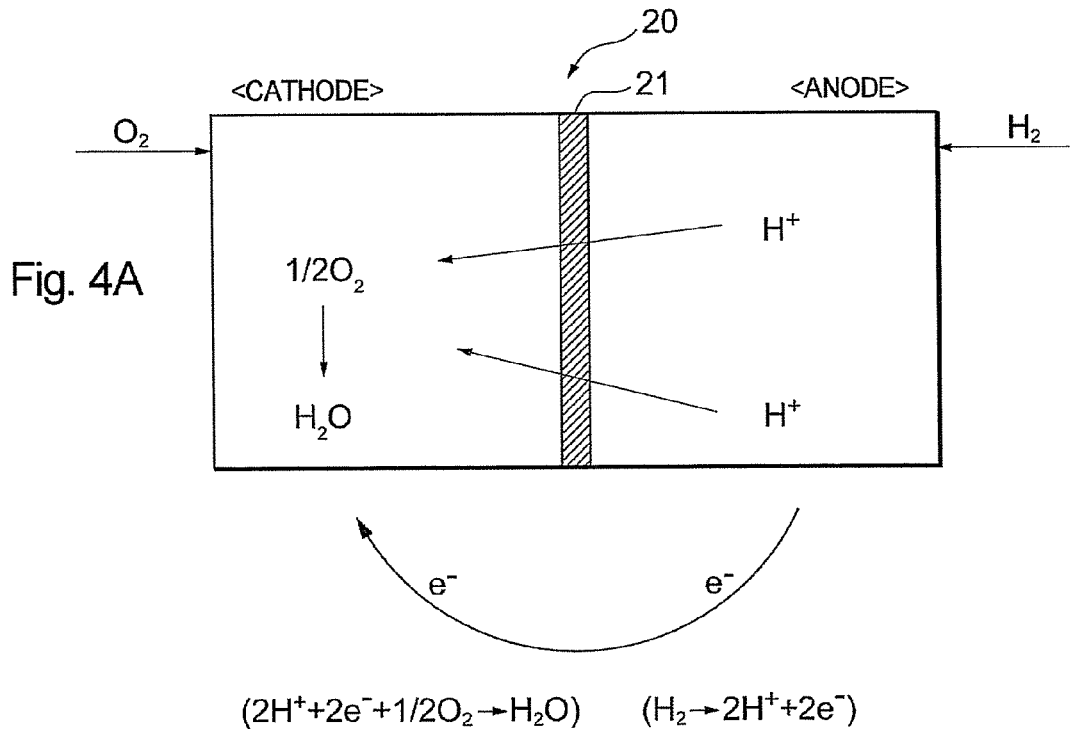
FIGS. 4A and 4B are explanatory views for explaining the generation principle of pumping hydrogen.
Figure 4B:
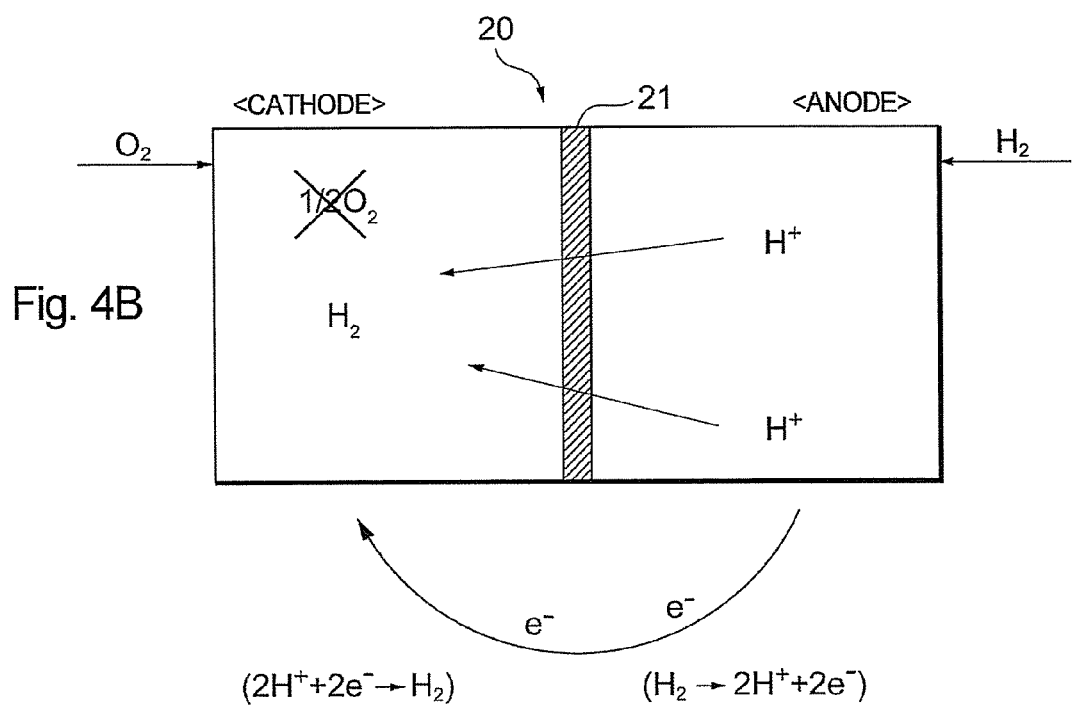

FIGS. 4A and 4B are diagrams for explaining the generation principle of the pumping hydrogen. FIG. 4A is a diagram showing the cell reaction during the normal operation, and FIG. 4B is a diagram showing the cell reaction during the low-efficiency operation. Each unitary cell 20 of the fuel cell 2 includes the electrolytic film 21, and also includes an anode and a cathode between which the electrolytic film 21 is sandwiched. The fuel gas containing hydrogen ($H_2$) is supplied to the anode, and the oxidizing gas containing oxygen ($O_2$) is supplied to the cathode. When the fuel gas is supplied to the anode, the reaction of the following chemical formula (A) proceeds to separate hydrogen into hydrogen ions and electrons. The hydrogen ions formed in the anode pass through the electrolytic film 21, and move to the cathode, whereas the electrons move from the anode to the cathode through an external circuit.

(A)

Here, when the oxidizing gas is sufficiently supplied to the cathode (the air stoichiometric ratio is 1.0 or more), the reaction of the following chemical formula (B) proceeds to form water from oxygen, the hydrogen ions and the electrons as shown in FIG. 4A. On the other hand, when the oxidizing gas to be supplied to the cathode runs short (the air stoichiometric ratio is less than 1.0), the reaction of the following chemical formula (C) proceeds in accordance with the amount of the oxidizing gas that runs short, and the hydrogen ions recombine with the electrons to form hydrogen as shown in FIG. 4B. The formed hydrogen is discharged together with the oxygen off gas from the cathode. Such hydrogen (i.e., an anode gas formed in the cathode) formed in the cathode by recombining the separated hydrogen ions and electrons is referred to as "the pumping hydrogen".

(B)

(C)

During the low-efficiency power generation to form such pumping hydrogen, when the dilution means is abnormal (when the back pressure valve 37 or the bypass valve 39 breaks down), the control device 6 sets the lower limit value of the output voltage of the fuel cell 2 so that the amount of the pumping hydrogen to be formed is a predetermined amount or less. That is, the control device 6 functions as one embodiment of control means in the present invention.

Figure 6:
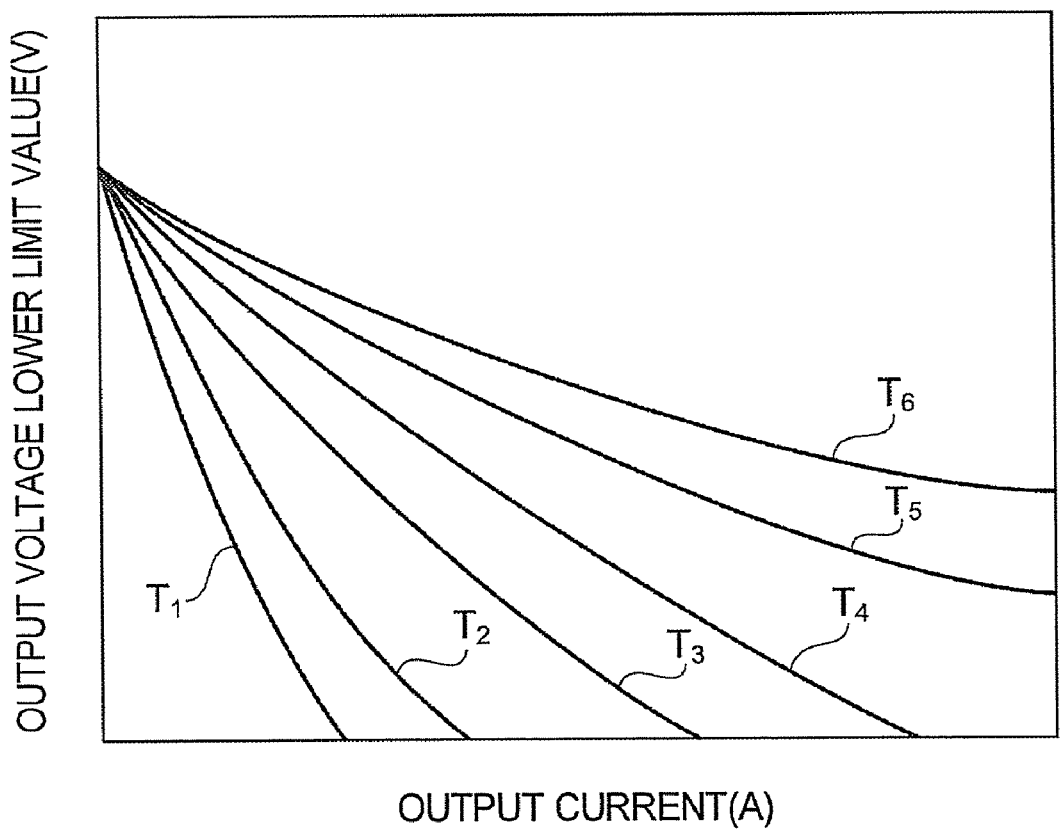
FIG. 6 is an approximated curve map prepared by plotting the data of a table shown in FIG. 5.

The specific voltage control of the control device 6 when the dilution means is abnormal during the low-efficiency power generation will be described with reference to FIGS. 5 and 6. FIG. 5 is a table which defines a relation among the output current (A) of the fuel cell 2 and the temperature (° C.) of the fuel cell 2 and the lower limit value (V) of the output voltage of the fuel cell 2, and FIG. 6 is a map showing an approximated curve drawn by plotting the values of the table of FIG. 5. The lower limit value of the output voltage of the fuel cell 2 shown in the table of FIG. 5 is a value set so that the amount of the pumping hydrogen to be formed is the predetermined amount or less in a case where the output current of the fuel cell 2 is changed from $I_1$ to $I_{10}$ and the temperature of the fuel cell 2 is changed from $T_1$ to $T_6$.

The control device 6 sets the lower limit value of the output voltage of the fuel cell 2 based on the output current of the fuel cell 2 detected by the current sensor 2a, the temperature of the fuel cell 2 detected by the temperature sensor 2c, and the table and map of FIGS. 5 and 6. For example, when the temperature of the fuel cell 2 is $T_3$, the control device 6 sets the lower limit value of the output voltage of the fuel cell 2 to $V_{31}, V_{32}, \ldots, V_{36}, \ldots$. Moreover, when the temperature of the fuel cell 2 is $T_6$, the control device 6 sets the lower limit value of the output voltage of the fuel cell 2 to $V_{61}, V_{62}, \ldots, V_{60}$. That is, when the temperature of the fuel cell 2 is $T_N$ (N: 1 to 6), the control device 6 sets the output current and output voltage in a region above the approximated curve $T_N$ (N: 1 to 6) drawn in the map of FIG. 6.

Moreover, the control device 6 estimates the pressure of the oxidizing gas to be supplied from the air compressor 31 based on the command value of the flow rate of the oxidizing gas circulating through the bypass passage 38, the open degree of the bypass valve 39 and the temperature of the oxidizing gas detected by the temperature sensor 36. Then, the control device 6 judges the abnormality of the dilution means (the breakdown of the back pressure valve 37 or the bypass valve 39) based on a deviation between this estimated pressure and the pressure of the oxidizing gas detected by the pressure sensor 35. That is, the control device 6 also functions as one embodiment of abnormality judgment means in the present invention.

The abnormality judgment technique of the dilution means by the control device 6 will specifically be described. An estimated pressure $P_E$ is calculated by the following equation in which Q (L/min) is the command value of the flow rate of the oxidizing gas circulating through the bypass passage 38, A (mm$^2$) is the open degree of the bypass valve 39, $P_L$ (kPa) (=101.3 (atmospheric pressure)) is the downstream pressure of the bypass valve 39, $P_E$ (kPa) is the estimated value (the estimated pressure) of the pressure of the oxidizing gas to be supplied from the air compressor 31, $T_0$ (° C.) is the temperature of the oxidizing gas to be supplied from the air compressor 31, and k (=0.226) is a unit conversion coefficient. It is to be noted that the flow rate command value Q of the oxidizing gas circulating through the bypass passage 38 and the open degree A of the bypass valve 39 are values determined by the control device 6 in accordance with the operation point of the low-efficiency operation of the fuel cell 2.

$$Q = k \times A \times \sqrt{P_L \times (P_E - P_L)} \times \sqrt{\frac{273.15 + T_0}{273.15}}$$

The control device 6 compares the estimated pressure $P_E$ calculated in this manner with the pressure (the detected pressure) $P_0$ detected by the pressure sensor 35, and calculates the absolute value e of the deviation between both the pressures. Moreover, in a case where the calculated absolute value e of the deviation exceeds a predetermined threshold value, the control device 6 judges that the back pressure valve 37 or the bypass valve 39 breaks down (the dilution means is abnormal).

Specifically, in a case where the estimated pressure $P_E$ is smaller than the detected pressure $P_0$ and the absolute value e of the deviation between the estimated pressure $P_E$ and the detected pressure $P_0$ exceeds the predetermined threshold value, the control device 6 judges that closing breakdown occurs in the bypass valve 39. When the closing breakdown occurs in the bypass valve 39, the oxidizing gas does not easily flow into the bypass passage 38, and the pressure (the detected pressure) of the oxidizing gas in the oxidizing gas supply passage 32 becomes significantly higher than a theoretical value (the estimated pressure). On the other hand, in a case where the estimated pressure $P_E$ is larger than the detected pressure $P_0$ and the absolute value e of the deviation between the estimated pressure $P_E$ and the detected pressure $P_0$ exceeds the predetermined threshold value, the control device 6 judges that opening breakdown occurs in the back pressure valve 37. When the opening breakdown occurs in the back pressure valve 37, the gas leaks on the downstream side of the back pressure valve 37, and hence the pressure (the detected pressure) of the oxidizing gas in the oxidizing gas supply passage 32 on the upstream side of the back pressure valve 37 becomes significantly lower than the theoretical value (the estimated pressure).

Next, a control method of the fuel cell system 1 according to the present embodiment will be described with reference to a flow chart of FIG. 7.

First, the control device 6 detects the temperature of the fuel cell 2 based on the sensor signal output from the temperature sensor 2c (a temperature detection step: S1), and compares the detected temperature with a predetermined reference temperature to judge whether or not warm-up is necessary (a warm-up judgment step: S2). In a case where the control device 6 judges in the warm-up judgment step S2 that the temperature of the fuel cell 2 exceeds the reference temperature and that the warm-up is not necessary, the control device realizes the normal operation (a normal operation step: S14). On the other hand, in a case where the control device 6 judges in the warm-up judgment step S2 that the temperature of the fuel cell 2 is the reference temperature or less and that the warm-up is necessary, the control device judges whether or not the dilution means is abnormal (whether or not the back pressure valve 37 or the bypass valve 39 breaks down) (a dilution means abnormality judgment step: S3).

<Low-Efficiency Operation at Abnormal Time>

In a case where the control device 6 judges in the dilution means abnormality judgment step S3 that the absolute value e of the deviation between the calculated estimated pressure $P_E$ and the detected pressure $P_0$ detected by the pressure sensor 35 exceeds the predetermined threshold value (the dilution means is abnormal), the control device performs the following abnormal time low-efficiency operation (a voltage lower limit value setting step S4 to an abnormal time current voltage control step S6).

That is, the control device 6 sets the lower limit value of the output voltage of the fuel cell 2 based on the output current of the fuel cell 2 detected by the current sensor 2a, the temperature of the fuel cell 2 detected by the temperature sensor 2c, and the table and map of FIGS. 5 and 6 (the voltage lower limit value setting step: S4). Then, the control device 6 sets a target low-efficiency operation point (a targeted output current command value and output voltage command value) above the set voltage lower limit value (the abnormal time low-efficiency operation point setting step: S5). Next, the control device 6 performs control by use of the high-voltage DC/DC converter 51 so as to bring the output voltage of the fuel cell 2 detected by the voltage sensor 2b close to the output voltage command value, and the control device 6 reduces the amount of the air to be supplied to the fuel cell 2 by use of the air compressor 31 or the back pressure valve 37, whereby control is performed to bring the output current of the fuel cell 2 detected by the current sensor 2a close to the output current command value (the abnormal time current voltage control step: S6).

Afterward, the control device 6 judges whether or not the temperature of the fuel cell 2 exceeds the predetermined reference temperature (a temperature judgment step: S7). When the temperature of the fuel cell 2 exceeds the reference temperature, the abnormal time low-efficiency operation is ended. When the temperature does not exceed the reference temperature, the processing returns to the dilution means abnormality judgment step S3 to continue the control. During the above abnormal time low-efficiency operation, the control of the dilution means constituted of the bypass valve 39 and the like is stopped.

<Low-Efficiency Operation at Normal Time>

On the other hand, in a case where the control device 6 judges in the dilution means abnormality judgment step S3 that the absolute value e of the deviation between the calculated estimated pressure $P_E$ and the detected pressure $P_0$ detected by the pressure sensor 35 is the predetermined threshold value or less (the dilution means is normal), the control device performs the following normal time low-efficiency operation (a normal time low-efficiency operation point setting step S8 to a hydrogen dilution step S12).

That is, the control device 6 sets a target low-efficiency operation point in accordance with a predetermined warm-up target temperature or the like (the normal time low-efficiency operation point setting step: S8), performs voltage control by use of the high-voltage DC/DC converter 51, and performs current control by use of the air compressor 31 or the back pressure valve 37 (the normal time current voltage control step: S9). Moreover, the control device 6 obtains a purge hydrogen amount and a pumping hydrogen amount corresponding to the set target low-efficiency operation point based on the map or the like, and adds up these amounts to calculate the total amount of hydrogen to be discharged from the fuel cell 2 (the total discharge hydrogen amount calculation step: S10). Subsequently, the control device 6 calculates dilution information (the command value of the flow rate of the oxidizing gas circulating through the bypass passage 38 or the like) necessary for setting the concentration of hydrogen to be discharged to a predetermined environmental reference value or less, based on the calculated total amount of hydrogen to be discharged (the dilution information calculating step: S11). Then, the control device 6 regulates the rotation number of the air compressor 31, the open degree of the back pressure valve 37, the open degree of the bypass valve 39 and the like based on the calculated dilution information, to dilute the pumping hydrogen discharged during the normal time low-efficiency operation (the hydrogen dilution step: S12).

Afterward, the control device 6 judges whether or not the temperature of the fuel cell 2 exceeds the predetermined reference temperature (a temperature judgment step: S13), ends the normal time low-efficiency operation when the temperature of the fuel cell 2 exceeds the reference temperature, and returns to the dilution means abnormality judgment step S3 to continue the control when the temperature does not exceed the reference temperature. During the above normal time low-efficiency operation, the dilution means constituted of the bypass valve 39 and the like can dilute the pumping hydrogen, and hence there is not any restriction on the lower limit value of the voltage.

In the fuel cell system 1 according to the embodiment described above, when the dilution means is normal, the concentration of the pumping hydrogen can be decreased by the dilution means, the low-efficiency power generation can be performed especially without setting the lower limit value of the voltage, and hence the warm-up (self heat generation) can effectively be performed. On the other hand, when the dilution means is abnormal, the low-efficiency power generation is performed while setting the voltage lower limit value of the fuel cell 2 to a specific value, whereby the amount of the pumping hydrogen to be formed can be suppressed to a predetermined amount or less.

It is to be noted that in the above embodiment, there has been described an example in which when the temperature of the fuel cell 2 lowers, the low-efficiency operation is performed for a purpose of warm-up, but the low-efficiency operation can be performed, in a case where the catalyst activity of the fuel cell 2 is recovered or it is detected that the electrode catalyst of the fuel cell 2 is poisoned.

Moreover, in the above embodiment, the temperature of the fuel cell 2 is detected by using the temperature sensor 2c attached to the fuel cell 2, to judge whether or not the warm-up is necessary, but instead of the temperature of the fuel cell 2, an outside air temperature or the temperature of a component around the fuel cell may be detected to judge whether or not the warm-up is necessary or the like.

INDUSTRIAL APPLICABILITY

As described in the above embodiment, a fuel cell system according to the present invention can be mounted in a fuel cell vehicle, and may be mounted in various mobile bodies (a robot, a ship, an airplane, etc.) other than the fuel cell vehicle. Moreover, the fuel cell system according to the present invention may be applied to a stational power generation system which is used as a power generation facility for a construction (a housing, a building or the like).

The invention claimed is:

1. A fuel cell system comprising: a fuel cell which generates a power and in which hydrogen ions formed in an anode pass through an electrolytic film and move to a cathode; a gas supply passage which supplies an oxidizing gas supplied from an oxidizing gas supply source to the cathode of the fuel cell; a gas discharge passage through which the gas discharged from the cathode of the fuel cell is circulated; a dilution device that dilutes the anode gas formed in the cathode of the fuel cell; a control device programmed to decrease the amount of a reactant gas to be supplied to the fuel cell to an amount smaller than that during normal power generation to realize low-efficiency power generation of the fuel cell, wherein the dilution device has a bypass passage which allows a part of the oxidizing gas flowing through the gas supply passage to bypass the fuel cell and which guides the gas to the gas discharge passage, and a bypass valve which regulates the flow rate of the oxidizing gas circulating through the bypass passage, and the dilution device dilutes the anode gas formed in the cathode of the fuel cell with the oxidizing gas flowing from the gas supply passage to the gas discharge passage through the bypass passage, wherein only when the dilution device is abnormal the control device is programmed to set the voltage lower limit value of the fuel cell so that the amount of an anode gas to be formed in a cathode of the fuel cell during the low-efficiency power generation is a predetermined amount or less.

2. The fuel cell system according to claim 1, further comprising:

a pressure sensor which detects the pressure of the oxidizing gas supplied from the oxidizing gas supply source; and an abnormality judgment device that estimates the pressure of the oxidizing gas to be supplied from the oxidizing gas supply source based on the command value of the flow rate of the oxidizing gas circulating through the bypass passage and the open degree of the bypass valve, and that judges the abnormality of the dilution device based on a deviation between the estimated pressure and the detected pressure detected by the pressure sensor.

3. The fuel cell system according to claim 2, wherein the abnormality judgment device judges that closing breakdown occurs in the bypass valve, when the estimated pressure is smaller than the detected pressure and the absolute value of the deviation between the estimated pressure and the detected pressure exceeds a predetermined threshold value.

4. The fuel cell system according to claim 2, wherein the dilution device has a back pressure valve which regulates the pressure of the gas circulating through the gas discharge passage, and wherein the abnormality judgment device judges that opening breakdown occurs in the back pressure valve, when the estimated pressure is larger than the detected pressure and the absolute value of the deviation between the estimated pressure and the detected pressure exceeds the predetermined threshold value.

5. A control method of a fuel cell system which includes a fuel cell to generate a power and in which hydrogen ions formed in an anode pass through an electrolytic film and move to a cathode; a gas supply passage which supplies an oxidizing gas supplied from an oxidizing gas supply source to the cathode of the fuel cell; a gas discharge passage through which the gas discharged from the cathode of the fuel cell is circulated; and a dilution device that dilutes the anode gas formed in the cathode of the fuel cell, the method comprising:

decreasing, with a control device, the amount of a reactant gas to be supplied to the fuel cell to an amount smaller than that during normal power generation to realize low-efficiency power generation of the fuel cell, and setting only when the dilution device is abnormal the voltage lower limit value of the fuel cell so that the amount of an anode gas to be formed in a cathode of the fuel cell during the low-efficiency power generation is a predetermined amount or less, wherein the dilution device has a bypass passage which allows a part of the oxidizing gas flowing through the gas supply passage to bypass the fuel cell and which guides the gas to the gas discharge passage, and a bypass valve which regulates the flow rate of the oxidizing gas circulating through the bypass passage, and the dilution device dilutes the anode gas formed in the cathode of the fuel cell with the oxidizing gas flowing from the gas supply passage to the gas discharge passage through the bypass passage.

* * * * *